May 31, 1927. 1,630,419
F. FORTIN
TRAP
Filed Oct. 16, 1925
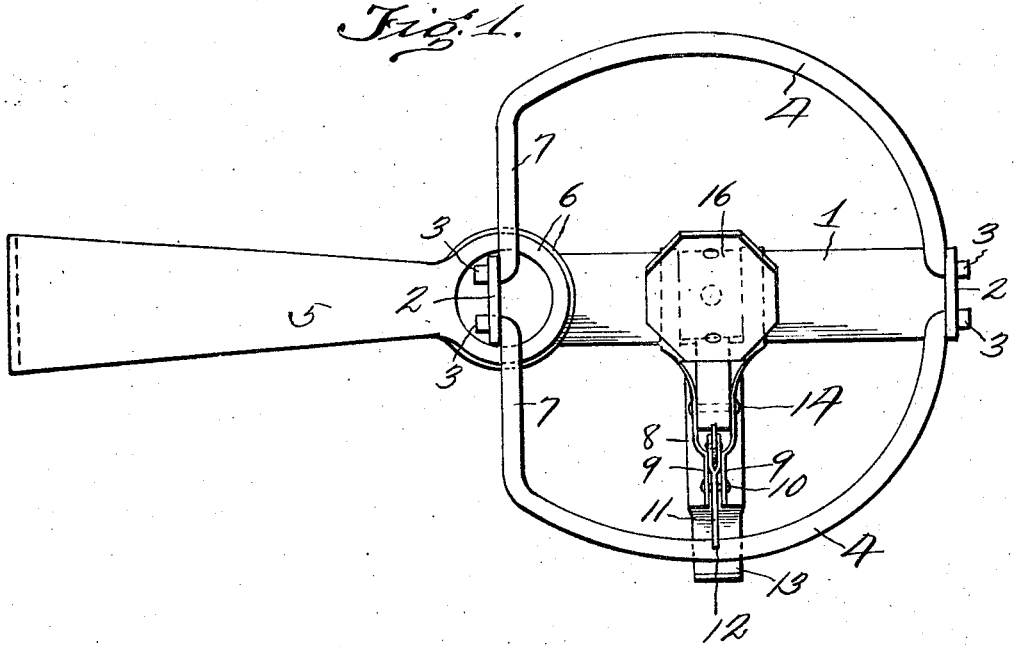
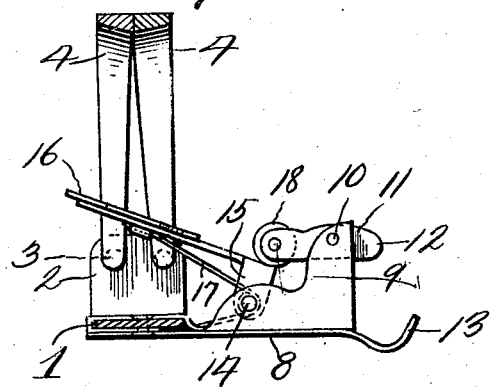
Inventor
F. Fortin
By D. Swift
Attorney Patented May 31, 1927.

1,630,419

UNITED STATES PATENT OFFICE.

FRANK FORTIN, OF WASHBURN, WISCONSIN.

TRAP.

Application filed October 16, 1925. Serial No. 62,742.

The invention relates to traps of the pivoted jaw type and has for its object to provide an automatic trigger therefor, which when the trap is opened will automatically set and hold the pivoted jaw, and which is constructed in a manner whereby the trap will quickly release.

A further object is to provide a trigger for a pivoted jaw trap comprising a bracket extending towards one of the jaws when the trap is in open position, and provided with a pivoted trigger adapted to cam pass the jaw, and the other end of the trigger with a roller, which engages over a pivoted bait plate arm for holding the jaw in open position and which roller allows a quick, rapid and easy release of the trigger upon a downward movement of the bait plate.

A further object is to provide a spring for normally maintaining the bait plate in raised position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a top plan view of the trap showing the same in open position.

Figure 2 is a vertical transverse sectional view through the trap showing the trigger in position for holding one of the pivoted bails when the same is forced downwardly.

Referring to the drawing, the numeral 1 designates the base plate of the trap, the ends of which are provided with upwardly extending ears in bearings of which the pintles 3 of the trap bails 4 are pivotally mounted. A U-shaped spring 5 of a conventional form is provided, which spring is provided with eyes 6, which surround one of the ears 2 and the upper eye is designed to be forced upwardly into engagement with the arms 7 of the bails 4 for forcing the bails together for gripping an animal, all of which structure is of a conventional form of trap. Secured to the base 1 is an outwardly extending bracket 8, which bracket is provided with upwardly extending spaced flanges 9. Pivotally mounted at 10 between the flanges 9 is a pawl 11, the outer end 12 of which is in the path of one of the bails 4, and when said last named bail is forced downwardly into engagement with the arm 13 of the bracket, the pawl 11 is tilted to a position where it will engage over the bail and hold the same in open position. The bracket 8 has pivotally mounted at 14 thereon the upwardly extending arm 15 of a bait receiving plate 16, which plate is normally forced upwardly to the position shown in Figure 2 by means of a spring 17. The inner end of the pawl 11 is provided with a roller 18, which engages over the adjacent end of the plate 16 above the pivotal point 14, and which roller, in combination with the plate prevents the bails 4 of the trap from moving together until the plate 16 is depressed, and at which time the roller 18 allows easy and quick depression of the plate for springing the trap.

In setting the trap the operator places his foot on the spring 5 and declutches the same, thereby allowing the jaws 4 to fall apart, and as one of the jaws 4 engages the end 12 of the pawl 11 the pawl will tilt on its pivotal point 10 until the bail passes the same and at which time the wheel 18 will come into engagement with the plate 16 adjacent the arms 15, and upon removing the foot from the spring 5, the bail will move upwardly against the end 12 of the pawl, and the trap will be set, therefore it will be seen that it will not be necessary for the operator to manipulate the trap in setting with his hands, and at the same time the trap can be easily and quickly set.

From the above it will be seen that an automatic setting device for a pivoted bail trap is provided which is simple in construction and quicker in release and that the device may be cheaply manufactured and sold, and if so desired applied to traps now in use.

The invention having been set forth what is claimed as new and useful is:—

1. The combination with a trap comprising a base, pivoted cooperating bails carried by said base, of a latching and releasing mechanism, said mechanism comprising a bracket carried by the base and extending towards one of the bails when said bail is in open position, upwardly extending flanges carried by said bracket, a pawl pivotally mounted between said flanges, the outer end of said pawl being in the path of the bail and adapted to engage over the bail when the bail is in open position, a pivoted plate carried by the bracket, spring means for normally forcing the pivoted plate upwardly, and a roller carried by the inner end of the pivoted pawl and engaging over the pivoted plate adjacent its pivotal point.

2. The combination with a pivoted bail trap, of a latching and tripping mechanism, said mechanism comprising a pivoted pawl, one end of said pawl being in the path of one of the bails and adapted to engage over the same, a pivoted bait plate pivoted adjacent the pawl, the other end of the pawl overlying the pivoted end of the bait plate and a roller carried by said last named end of the pawl and engaging over the base plate.

3. The combination with a trap comprising a base, spring actuated pivoted bails carried by said base, of a bracket extending outwardly from the base, vertically disposed spaced flanges carried by said bracket, a pivoted pawl pivoted between said flanges, the pawl having its outer end in the path of one of the bails and adapted to engage over the bail, a bait plate, downwardly extending arms carried by the bait plate and pivoted between the flanges, spring means for normally forcing the bait plate upwardly, said pawl having its inner end overlying the pivoted end of the bait plate and a roller carried by said last named pawl end and engaging the bait plate.

In testimony whereof I have signed my name to this specification.

FRANK FORTIN.